US008327007B2

(12) United States Patent
Liu et al.

(10) Patent No.: US 8,327,007 B2
(45) Date of Patent: Dec. 4, 2012

(54) SYSTEMS AND METHODS FOR SNMP ACCESS

(75) Inventors: Jianping Liu, Chengdu (CN); Yongqing Liu, Chengdu (CN); Fei Yang, Chengdu (CN); Alan Yang, Palo Alto, CA (US)

(73) Assignee: Iyuko Services L.L.C., Dover, DE (US)

( * ) Notice: Subject to any disclaimer, the term of this patent is extended or adjusted under 35 U.S.C. 154(b) by 664 days.

(21) Appl. No.: 11/824,396

(22) Filed: Jun. 29, 2007

(65) Prior Publication Data

US 2009/0006453 A1 Jan. 1, 2009

(51) Int. Cl.
G06F 15/16 (2006.01)

(52) U.S. Cl. ....................................................... 709/230
(58) Field of Classification Search .................... 709/230
See application file for complete search history.

(56) References Cited

U.S. PATENT DOCUMENTS

| | | | |
|---|---|---|---|
| 6,466,971 B1 | 10/2002 | Humpleman et al. | 709/220 |
| 6,519,635 B1 | 2/2003 | Champlin et al. | 709/223 |
| 6,701,359 B1 | 3/2004 | Calabrez et al. | 709/223 |
| 6,748,436 B1 | 6/2004 | Anand et al. | 709/226 |
| 7,454,743 B2 * | 11/2008 | Fuchs | 717/108 |
| 2002/0116486 A1 * | 8/2002 | Toure et al. | 709/223 |
| 2002/0156880 A1 | 10/2002 | Mokuya | |
| 2003/0009543 A1 * | 1/2003 | Gupta | 709/223 |
| 2003/0074430 A1 * | 4/2003 | Gieseke et al. | 709/221 |
| 2003/0110261 A1 | 6/2003 | Seo et al. | 709/225 |
| 2003/0177477 A1 * | 9/2003 | Fuchs | 717/136 |
| 2003/0200301 A1 * | 10/2003 | Trzcinko et al. | 709/223 |
| 2004/0230692 A1 * | 11/2004 | Tachiyama et al. | 709/230 |
| 2006/0024228 A1 * | 2/2006 | Liang et al. | 709/223 |
| 2006/0047801 A1 * | 3/2006 | Haag et al. | 709/223 |
| 2007/0208842 A1 * | 9/2007 | Jeghers | 709/223 |
| 2008/0040467 A1 * | 2/2008 | Mendiratta et al. | 709/223 |
| 2009/0006453 A1 * | 1/2009 | Liu et al. | 707/102 |
| 2010/0077091 A1 * | 3/2010 | Sarkar et al. | 709/230 |

FOREIGN PATENT DOCUMENTS

| | | |
|---|---|---|
| CN | 1378173 A | 11/2002 |
| EP | 1480377 | 11/2004 |
| JP | 06124254 | 5/1994 |
| JP | 06124254 | 6/1994 |

OTHER PUBLICATIONS

John, A.; Vanderveen, K.; Sugla, B., "A Java-based SNMP agent for dynamic MIBs," Global Telecommunications Conference, 1999. GLOBECOM '99 , vol. 1A, No., pp. 396-400 vol. 1a, 1999.*

Klie, T.; Straub, F., "Integrating SNMP agents with XML-based management systems," Communications Magazine, IEEE , vol. 42, No. 7, pp. 76-83, Jul. 2004.*

Schonwalder, J.; Muller, A; Reverse engineering Internet MIBs, Aug. 7, 2002, IEEE.*

(Continued)

Primary Examiner — Lynn Feild
Assistant Examiner — Melvin H Pollack

(57) ABSTRACT

Systems and methods for SNMP access are disclosed. A computer-implemented method of SNMP access includes mapping a MIB object in a MIB into an XML object in an XML document, generating a class library based on the XML document, creating a service object representative of a service associated with SNMP access to the MIB object, and linking the class library according to the service object to perform the service.

16 Claims, 4 Drawing Sheets

OTHER PUBLICATIONS

Jeong-Hyuk Yoon, Hong-Taek Ju, and James W. Hong. 2003. Development of SNMP-XML translator and gateway for XML-based integrated network management. Int. J. Netw. Manag. 13, 4 (Jul. 2003), 259-276.*

Yoon-Jung Oh, Hong-Taek Ju, Mi-Jung Choi, and James Won-Ki Hong. 2002. Interaction Translation Methods for XML/SNMP Gateway. In Proceedings of the 13th IFIP/IEEE International Workshop on Distributed Systems: Operations and Management: Management Technologies for E-Commerce and E-Business Applications (DSOM '02), Metin Feridun, Peter G. Kropf.*

Extended European Search Report received in European Application No. 07015334.1 dated Oct. 20, 2008 (12 pages).

Cherkaoui O et al:"Towards a modular and interoperable SNMPv3" Network Operations and Management Symposium, 1998. NOMS 98., IEEE New Orleans, LA, USA Feb. 15-20, 1998,New York, NY,USA,IEEE, US, vol. 2, Feb. 15, 1998 (4 pages).

Yoda I et al:"Object oriented TMN based operations systems development platform" Communications,1994. ICC '94, Supercomm/ICC '94, Conference Record,' Serving Humanity Through Communications.' IEEE International Conference E on New Orleans, LA, USA May 1-5, 1994, New York, NY, USA, IEEE, May 1, 1994 (6 Pages).

English translation of abstract of JP06124254 (1 page).

Partial European Search Report received in European Application No. 07015334.1 dated Jun. 10, 2008 (6 pages).

"Towards a modular and interoperable SNMPv3", Network Operations and Management Symposium, 1998. NOMS 98., IEEE New Orleans, LA, USA Feb. 15-20, 1998, New York, NY, USA, IEEE, US, vol. 2, Feb. 15, 2008, p. 391-394 (4 pages).

* cited by examiner

300

| <MAPPING> | NAME |
| --- | --- |
| | TYPE |
| <OBJECTS> ||
| <OBJECT> | NAME |
| | OID |
| | SYNTAX |
| | WRITABLE |
| | ROW_CREATE |
| | ROWSTATUS_OID |
| | GET_METHOD |
| | NON_REP |
| | MAX_REP |
| <INDEXES> | ENTRY_OID |
| | ENTRY_NAME |
| <INDEX> | NAME |
| | OID |
| | SYNTAX |

FIG. 3

SYSTEMS AND METHODS FOR SNMP ACCESS

TECHNICAL FIELD

The present invention relates to computer networks in general, and more particularly to systems and methods for simple network management protocol (SNMP) access.

BACKGROUND

With the proliferation of computer networks, the need has developed for more powerful tools to manage computer networks as they increase in size and complexity. One facility available for managing computer networks is the simple network management protocol (SNMP). The SNMP includes two primary elements: a manager and agents. The SNMP manager is the console through which the network administrator performs network management functions. The SNMP agents are entities that interface to the actual network devices being managed. Hubs, routers or network servers are examples of managed network devices that contain managed objects. The managed objects of each managed network device might be hardware, configuration parameters, performance statistics, and so on, that directly relate to the current operation of the managed network device. The managed objects are arranged in a management information base (MIB) and each managed object is referred to as a MIB object in the MIB. The SNMP allows managers and agents to communicate for the purpose of accessing these MIB objects.

The structure of management information (SMI), a SNMP standard, defines the rules for how MIB objects are structured, described and organized in the MIB. Typically, the MIB is organized in a tree structure composed of branch nodes and leaf nodes. The MIB objects representing the managed objects of the same network device usually reside at the leaf nodes rooting from the same branch node. Each MIB object has an object identifier (OID), which is a sequence of integers in a tree structure that uniquely identifies the MIB object residing at a leaf node. When the manager requests a value of a MIB object from an agent, the OID of the MIB object should be sent by the manager and traversed by the agent.

To perform SNMP access, a variable binding that contains an OID, a type and a corresponding object value, should be built. The variable bindings are the actual data that are transported back and forth inside SNMP messages. Typically, the SNMP uses five basic messages (GET, GET-NEWT, GET-RESPONSE, SET, and TRAP) to communicate between the manager and an agent. For instance, when the manager wants to know the value of a MIB object, such as the system name or the system uptime, the manager will assemble a GET packet that includes the OID for the MIB object. Upon receiving the GET packet, the agent will assemble and send a GET-RESPONSE packet to the manager with either the current value of the MIB object or an error indication as to why the request cannot be processed. Similarly, the manager will assemble a SET packet that includes the OID for each MIB object of interest, thereby requesting a change be made to the value of the MIB object. The agent will then respond with a SET-RESPONSE packet indicating the change has been made or an error indication as to why the change cannot be made. The agent can also assemble and send a TRAP packet that includes OID and value information (bindings) to spontaneously inform the manager of an important event. The manager can use the bindings to correlate and manage the event.

Though the SNMP access is simple due to the small number of command messages (GET, GET-NEWT, GET-RESPONSE, SET, and TRAP), it requires that the user have in-depth knowledge of the MIB, and particularly be familiar with the OID of each MIB object. Also, building the variable binding which includes the OID and the corresponding object value is typically a tedious task when the manager performs the SNMP access. Additionally, the manager needs to translate the response from the agent into a readable service value to facilitate user understanding and decision-making.

SUMMARY

In one embodiment, a computer-implemented method of SNMP access is provided. The method includes mapping a MIB object in a MIB into an XML object in an extensible markup language (XML) document, generating a class library based on the XML document, creating a service object representative of a service associated with SNMP access to the MIB object, and linking the class library according to the service object to perform the service.

BRIEF DESCRIPTION OF THE DRAWINGS

Advantages of the present invention will be apparent from the following detailed description of exemplary embodiments thereof, which description should be considered in conjunction with the accompanying drawings, in which:

FIG. 3 is a table illustrating an XML object structure according to one embodiment of the present invention.

DETAILED DESCRIPTION

Figure 1:
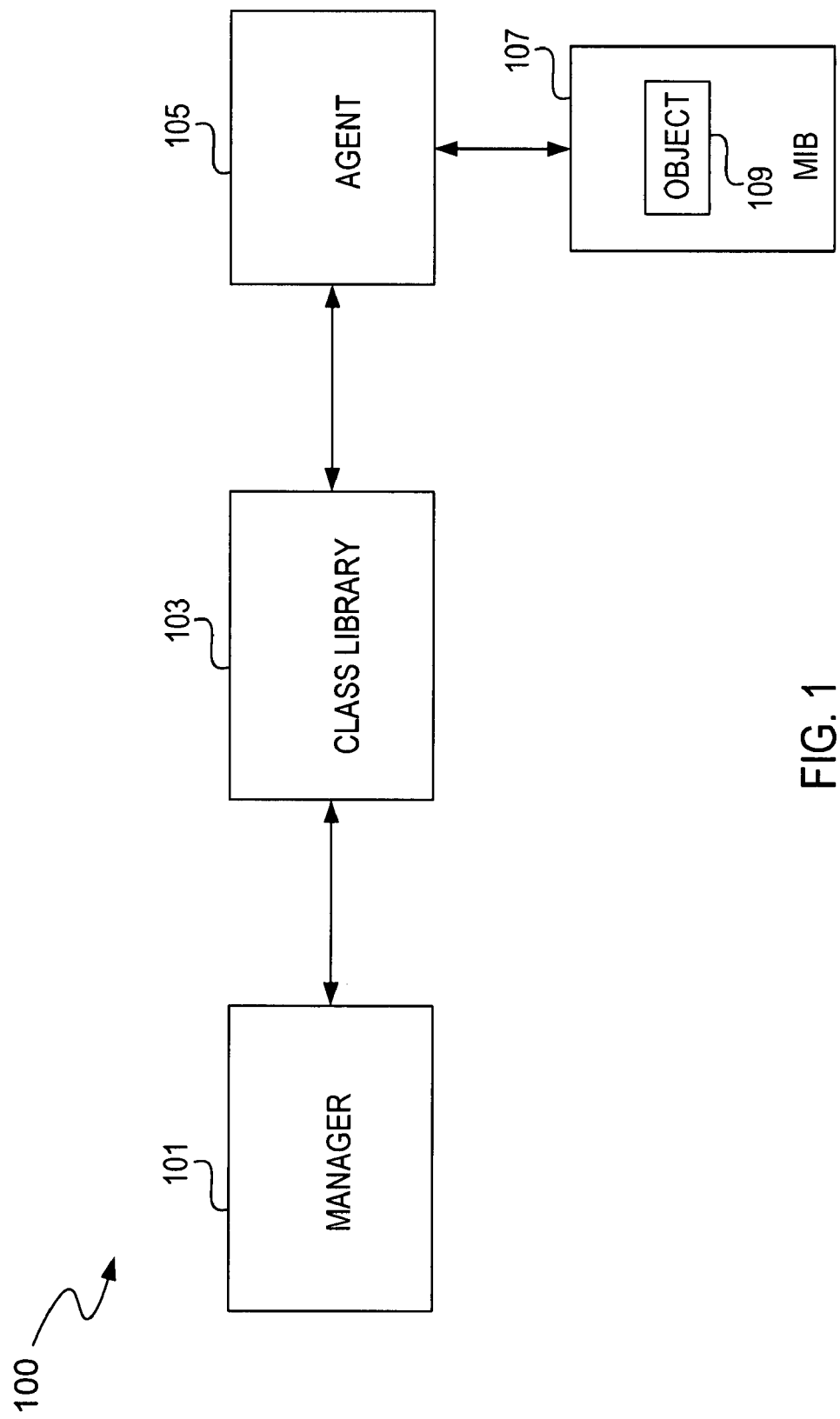
FIG. 1 is a block diagram of a SNMP management system according to one embodiment of the present invention.

Reference will now be made in detail to embodiments of the present invention. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "mapping," "generating," "creating," "linking," "parsing," "programming," "invoking," "translating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

FIG. 1 illustrates a block diagram of a SNMP management system 100 according to one embodiment of the present invention. The SNMP management system 100 includes a manager 101, a class library 103, an agent 105 and a MIB 107. The class library 103 mediates between the manager 101 and the agent 105 to translate a service associated with a predetermined MIB object into a command message and the OID of the predetermined MIB object. For example, the MIB 107 includes a MIB object 109 having the OID "1.3.6.1.2.1.1.5", which represents a system name. According to a conventional SNMP management system, a manager needs to send the command message (e.g., SET), the value (e.g., O2MICRO) and the OID "1.3.6.1.2.1.1.5" in the format readable by an agent to set a MIB object (the system name) as "O2MICRO".

Advantageously, the manager 101 in the SNMP management system 100 mainly cares about the services associated with SNMP access to the MIB object 109 such that there is a decreased requirement of MIB knowledge for users. In this instance, the manager 101 simply executes instructions like "SystemMO mo=new SystemMO( ); mo.sysName="O2MICRO"; mo.doset( );" to perform the service of setting the MIB object 109 (the system name) as "O2MICRO". As illustrated, these instructions can be interpreted into setting the MIB object 109 (the system name) as "O2MICRO" in a literal sense. In one embodiment, these instructions may be programmed in an object-oriented programming language, such as Java, C++, Smalltalk, Object Pascal, Objective C, etc., which is user-friendly and has a decreased requirement for MIB knowledge. The class library 103 is capable of translating these instructions into a SET packet containing the command message (e.g., SET), the value (e.g., O2MICRO) and the OID "1.3.6.1.2.1.1.5". The SET packet is further sent to the agent 105, which in turn sets the MIB object 109 (the system name) as "O2MICRO". Furthermore, the response from the agent 105, e.g., a SET-RESPONSE packet, can be translated into a service value readable by users by the class library 103. The service value is further transferred to the manager 101 such that no additional effort of response translation is required at the manager 101 side.

Figure 2:
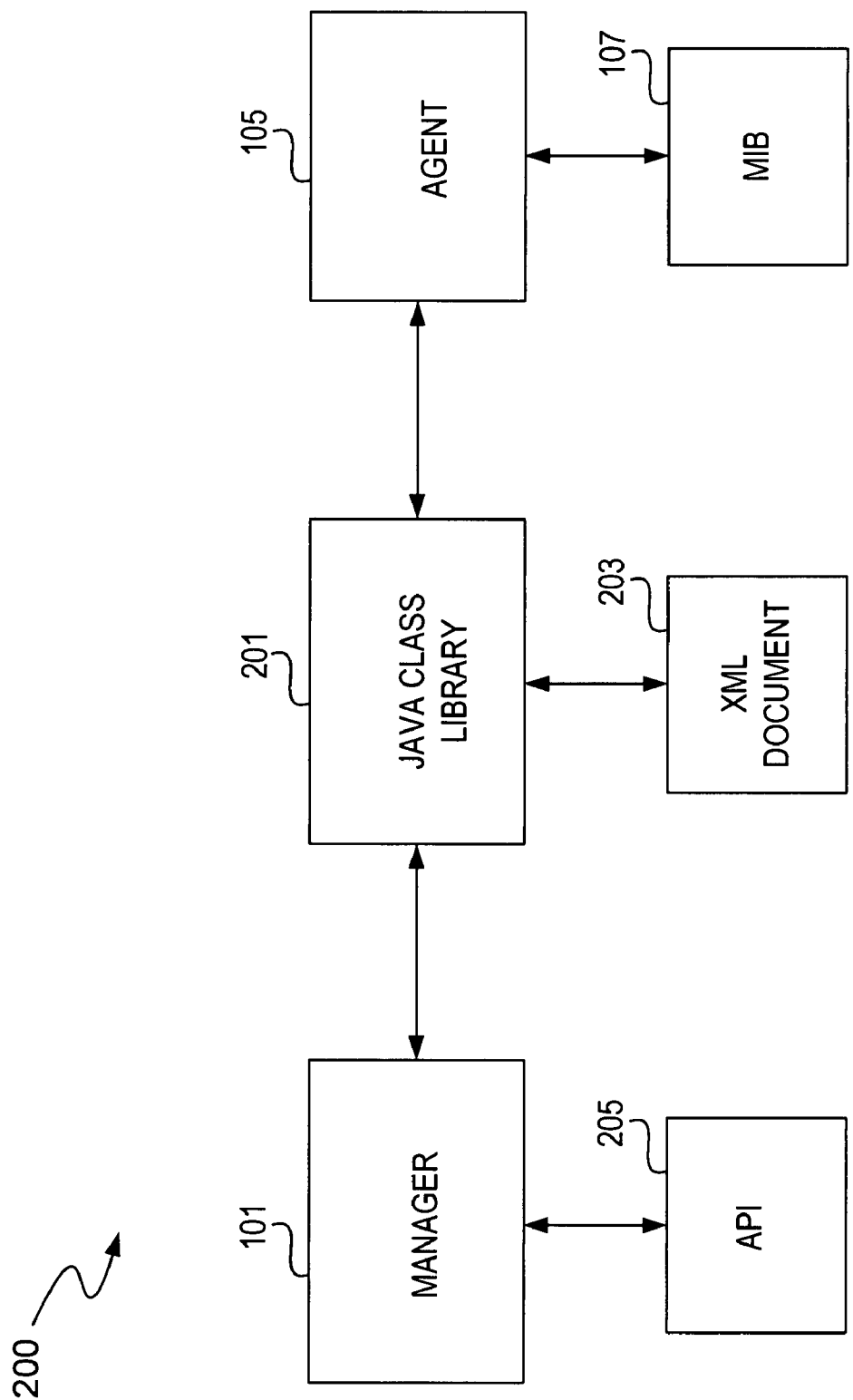
FIG. 2 is a block diagram of a Java-based SNMP management system according to one embodiment of the present invention.

FIG. 2 illustrates a block diagram of a Java-based SNMP management system 200 according to one embodiment of the present invention. Elements labeled the same in FIG. 1 have similar functions and will not be repetitively described herein for purposes of brevity, and clarity. Besides the manager 101, the agent 105 and the MIB 107, the Java-based SNMP management system 200 further includes a Java class library 201, a XML document 207 and an application programming interface (API) 205. In the Java-based SNMP management system 200, the Java class library includes a plurality of classes and each class represents a plurality of MIB objects associated with the same network device in the MIB 107. The manger 101 accesses the plurality of MIB objects by linking the Java class library 201 and loading the corresponding class.

In one embodiment, the Java class library 201 is generated based on an XML document 203, which defines how a MIB object in the MIB 107 is mapped into an XML object. In one embodiment, a plurality of MIB objects which are associated with the same network device and reside at the leaf nodes rooting from the same brand node may be wrapped together to create an XML object. Referring to FIG. 3, a table 300 illustrates an exemplary XML object structure. The XML object structure uses a plurality of tags, such as "<mapping>", "<objects>", "<object>", "<table-specific>" "<indexes>" or "<index>", to define the MIB mapping. In one embodiment, the tag "<mapping>" indicative of an XML object may include a plurality of variables such as "name" and "type". The variable "name" represents the name of the mapping. The variable "type" represents the type of the mapping.

According to the MIB objects mapped from the MIB 107 to the XML object, there are two types of mapping: group type and table type. When the MIB object is in a table format in the MIB 107, the table type mapping will occur. The tag "<objects>" indicates the plurality of MIB objects that are associated with the same network device and wrapped into the same XML object. The tag "<object>" indicates each wrapped MIB object underneath the tag "<objects>". The tag "<object>" may include a plurality of variables such as "name", "oid", "syntax" and "writable". The variable "name" represents the name of the MIB object. The variable "oid" represents the OID of the MIB object. The variable "syntax" represents the type of the MIB object, such as an integer or an octet string. The variable "writable" represents whether the MIB object is writable.

The tags "<table-specific>", "<indexes>" and "<index>" are defined specifically for the table type mapping. The tag "<table-specific>" may include a plurality of variables such as "row_create", "rowstatus_oid", "get_method", "non_rep" and "max_rep". The variable "row_create" represents the row status when a new row is created. The variable "rowstatus_oid" represents the OID of the row status. The variable "get_method" represents the methods of getting values, which include "getnext" and "getbulk" in one embodiment. The variable "non_rep" represents that there is no repeat when the variable "get_method" is defined as "getbulk". The variable "max_rep" represents the maximum repetition when the variable "get_method" is defined as "getbulk". The tag "<indexes>" may include a plurality of variables such as "entry_oid" and "entry_name". The variable "entry_oid" represents the OID of table entry in the MIB 107. The variable "entry_name" represents the name of table entry in the MIB 107. The tag "<index>" may include a plurality of variables such as "name", "oid" and "syntax". The variable "name" represents the name of the index. The variable "oid" represents the OID of the index and the variable "syntax" represents the type of the index, such as an integer or a string.

Examples of XML objects in the XML document are shown as below, respectively representing the XML object "system" of the group type mapping and the XML object "addrTable" of the table type mapping.

Group type mapping (XML object "system"):

Turning to FIG. 2, the Java class library 201 may be generated based on the XML document 203. In one embodiment, an XML object parser (not shown) may parse the XML document 203 to generate the Java class library 201. Via the parsing process, each XML object in the XML document 203 is mapped into a Java class. As a whole, after being mapped into an XML object in the XML documents 203, the plurality of MIB objects associated with the same network device are further mapped from the XML object into a Java class. The Java class specifies field variables (properties) and methods (behaviors) that the plurality of MIB objects can work with, such that the manager 101 can access the plurality of MIB objects by invoking the methods of the corresponding Java class. In one embodiment, such methods may be named after the services associated with SNMP access to the plurality of MIB objects, to facilitate the programming of instructions representative of such services at the manager 101 side. Particularly, the manager 101 needn't specify the command message and the OID to perform a service associated with SNMP access to an MIB object.

In operation, the manager 101 simply executes instructions in Java language and representative of the service. In response to the instructions, the manager 101 can link the Java class library 201, load the corresponding Java class and invoke the corresponding method to perform the service. Additionally,

```
<mapping name="system" type="group">
    <objects>
        <object name="sysDescr" oid="1.3.6.1.2.1.1.1" syntax="OCTET STRING" writable="false"/>
        <object name="sysObjectID" oid="1.3.6.1.2.1.1.2" syntax="Unknown syntax <0x0>" writable="false"/>
        <object name="sysUpTime" oid="1.3.6.1.2.1.1.3" syntax="TIMETICKS" writable="false"/>
        <object name="sysContact" oid="1.3.6.1.2.1.1.4" syntax="OCTET STRING" writable="true"/>
        <object name="sysName" oid="1.3.6.1.2.1.1.5" syntax="OCTET STRING" writable="true"/>
        <object name="sysLocation" oid="1.3.6.1.2.1.1.6" syntax="OCTET STRING" writable="true"/>
        <object name="sysServices" oid="1.3.6.1.2.1.1.7" syntax="INTEGER" writable="false"/>
    </objects>
</mapping>
```

Table type mapping (XML object "addrTable"):

```
<mapping name="addrTable" type="table" version_oid="1.3.6.1.4.1.22924.4.1.1.3.201">
    <objects>
        <object name="addrName" oid="1.3.6.1.4.1.22924.2.3.1.1.1.1" syntax="OCTET STRING"/>
        <object name="addrType" oid="1.3.6.1.4.1.22924.2.3.1.1.1.2" syntax="INTEGER" writable="false"/>
        <object name="addrIpOrNetwork" oid="1.3.6.1.4.1.22924.2.3.1.1.1.3" syntax="IPADDRESS"/>
        <object name="addrEndIpOrNetmask" oid="1.3.6.1.4.1.22924.2.3.1.1.1.4" syntax="IPADDRESS"/>
        <object name="addrTableRS" oid="1.3.6.1.4.1.22924.2.3.1.1.1.5" syntax="INTEGER"/>
    </objects>
    <table-specific row_create="4" rowstatus_oid="1.3.6.1.4.1.22924.2.3.1.1.1.5" get_method="getnext" non_rep="0" max_rep="10">
        <indexes entry_oid="1.3.6.1.4.1.22924.2.3.1.1.1" entry_name="addrEntry">
            <index name="addrName" oid="1.3.6.1.4.1.22924.2.3.1.1.1.1" syntax="STRING"/>
        </indexes>
    </table-specific>
</mapping>
``` the API 205 that is a collection of classes and methods may be used by the manager 101 to make the programming easier.

Also, Java classes are related. In one embodiment, the relation between Java classes is inheritance, which involves derived classes and base classes. Derived classes can include several kinds of customizations to the respective base classes, such as addition of new filed variables, addition of new methods and overriding of existing methods to support the new field variables. Conceptually, a base class may be considered as a common part of derived classes. A derived class is created by extending the base class.

In one embodiment, the Java class library 201 may include a base class BaseMO. The base class BaseMO includes a plurality of filed variables and a plurality of methods that belong to a common part of derived classes, e.g., GroupMO and TableMO. For example, the plurality of field variables defined in the base class BaseMo include "_o2_Reqparam", "_o2_Excutor", "_o2_Mapmodule", "_o2_Mapname" and "_o2_Object". The plurality of methods defined in the base class BaseMo include "getExcutor( )", "setExcutor(IMapExecutor)", "getMapModule( )", "getReqaram(RequestParam)", copyFrom(BaseMO)", "getUserObject( )", and "setUserObject(Object)".

Via inheritance, the derived class GroupMO can be created based on the base class BaseMO to represent the XML objects having the group type mapping. For instance, the derived class GroupMO can be programmed as below.

```
public class GroupMO<E extends GroupMO> extends BaseMO
{
    private static final long serialVersionUID = 3257291309642757941L;
    public E doGet( ) throws SnmpException
    {
        return (E)this._o2_Excutor.get(this);
    }
}
```

Similarly, the derived class TableMO can be created based on the base class BaseMO to represent the XML objects having the table type mapping. For instance, the derived class TableMO can be programmed as below.

```
public class TableMO<E extends TableMO> extends BaseMO
{
    private static final long serialVersionUID = 3257562927769792825L;
    protected String         _o2_Index;
    public void setIndex(String index)
    {
        this._o2_Index = index;
    }
    public String getIndex( )
    {
        return this._o2_Index;
    }
    public List<E> doGetTable( ) throws SnmpException
    {
        return (List<E>)this._o2_Excutor.getTable(this);
    }
}
```

Advantageously, the derived classes GroupMO and TableMO can be further inherited to create a particular class to represent a particular XML object. As a whole, the particular class representing the particular XML object also represents the plurality of MIB objects in the MIB 107 which have been mapped into the particular XML object. For example, a derived class SystemMO can be programmed as below to represent the XML object "System".

```
public class SystemMO extends GroupMO<SystemMO>
{
    public String sysDescr;
    public String sysObjectID;
    public String sysUpTime;
    public String sysContact;
    public String sysName;
    public String sysLocation;
    public String sysServices;
    public SystemMO( )
    {
        this._o2_MapName = "system@RFC1213-MIB";
    }
}
```

Similarly, a derived class AddrTableMO can be programmed as below to sent the XML object "addrTable".

```
public class AddrTableMO extends TableMO<AddrTableMO>
{
    public String addrName;
    public String addrType;
    public String addrIpOrNetwork;
    public String addrEndIpOrNetmask;
    public String addrTableRS;
    public AddrTableMO( )
    {
        this._o2_MapName = "addrTable@MATRIX-ADDR-MIB";
    }
}
```

As illustrated above, the methods defined in the Java classes are named after services associated with SNMP access to facilitate the programming at the manager 101 side. By invoking the methods encapsulated in the Java classes, the manager 101 can access the MIB objects in the MIB 107 without going through the tedious task of organizing the command message and the OID. The manager 101 simply executes the instructions representative of the services associated with SNMP access. For example, the manager 101 executes instructions like "SystemMO mo=new SystemMO( ); mo.sysName="O2MICRO"; mo.doset( );" to set the MIB object of the system name as "O2MICRO". In particular, the instruction "SystemMO mo=new SystemMO( )" functions to create a service object "mo" representative of the service requested by the manager 101. Concurrently, the manager 101 links the Java class library 201 to load the Java class SystemMO in response to creation of the service object "mo". In this instance, the instructions "mo.sysName="O2MICRO"; mo.doset( );" can invoke the method "doset( )" encapsulated in the Java class SystemMO to perform the service requested by the manager 101. Furthermore, a return value of the invoked method "doset( )" is readily readable by users such that the manger 101 needn't translate the response from the agent 105 any more.

In conclusion, the behavior of the invoked method may be to translate the instructions representative of the service into the command message and the OID readable by the agent 105, in one embodiment. In response to the command message and the OID, the agent 105 can access the MIB objects in the MIB 107. As such, the user needn't make additional effort to organize the command message and the OID to perform the service. In one embodiment, the behavior of the invoked method may be to translate the response from the agent 105 into a service value readily readable by users. As such, the effort for the manager 101 to translate the response from the agent 105 into a readable service value to facilitate user understanding and decision-making is also unnecessary. In other words, behaviors defined in the Java classes are invisible to the manager 101, such that the manager 101 can concentrate on programming the instructions representative of the services associated with SNMP access to invoke the corresponding Java classes and methods. In this way, users can access the MIB objects by using an object-oriented language which is user-friendly and has a decreased requirement for MIB knowledge, such as Java, C++, Smalltalk, Object Pascal, Objective C, etc.

Figure 4:
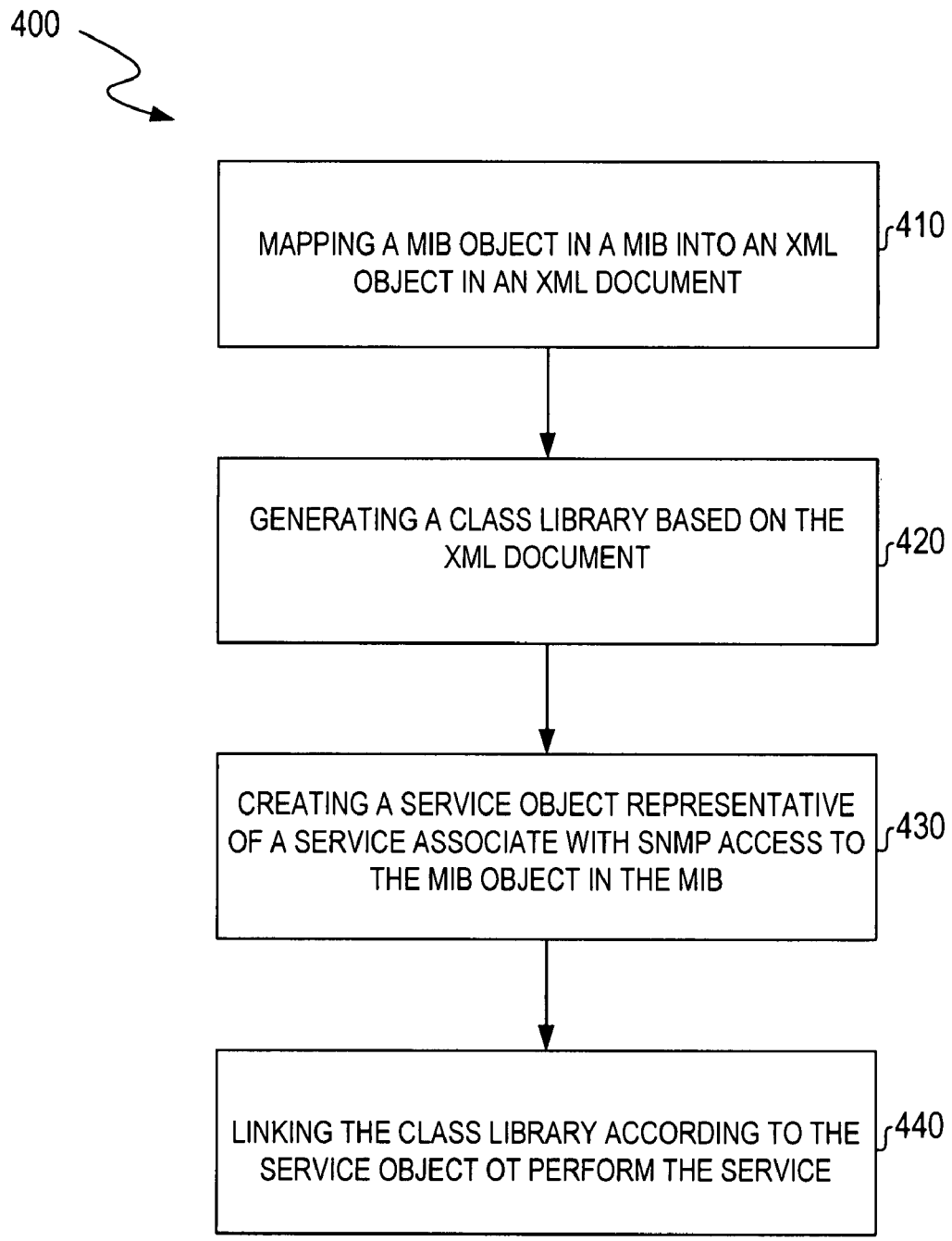
FIG. 4 is a flow chart of a computer-implemented method of SNMP access according to one embodiment of the present invention.

FIG. 4 is a flow chart 400 of a computer-implemented method of SNMP access. Although specific steps are disclosed in FIG. 4, such steps are exemplary. That is, the present invention is well suited to performing various other steps or variations of the steps recited in FIG. 4. FIG. 4 is described in combination with FIG. 2. In one embodiment, flow chart 400 can be implemented by a computer system as computer-readable program instructions stored in a memory unit and executed by a processor.

In block 410, a MIB object in a MIB is mapped into an XML object in an XML document. In one embodiment, the MIB object of the system name in the MIB 107 is mapped into the XML object "system" in the XML document 203. In block 420, a class library is generated based on the XML document. In one embodiment, the XML object parser can be used to parse the XML objects in the XML document 203 and thereby to generate the Java class library 201. In block 430, a service object representative of a service associated with SNMP access to the MIB object in the MIB is created. In one embodiment, a service object "mo" is created to represent the service of setting the MIB object of the system name as "O2MICRO". In block 440, the class library is linked according to the service object to perform the service. In one embodiment, the Java class library 201 is linked in response to creation of the service object "mo" to perform the service of setting the MIB object of the system name as "O2MICRO".

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A non-transitory computer-readable medium having program instructions stored thereon, wherein the program instructions are executable to cause a computer system to perform a method comprising:
   mapping a plurality of management information base (MIB) objects associated with a network device into one or more extensible markup language (XML) objects in an XML document; and
   parsing the XML document to generate a class library, wherein the one or more XML objects are mapped into a class included in the class library via the parsing;
   wherein the class includes a method invokable by a simple network management protocol (SNMP) manager to issue, to an SNMP agent, a command message and an object identifier (OID) of an MIB object.

2. The non-transitory computer-readable medium of claim 1, wherein the XML document includes a type variable representing a type of the mapping, and wherein the type of the mapping includes a group type mapping and a table type mapping.

3. The non-transitory computer-readable medium of claim 1, wherein the XML document includes an XML object specifying the OID.

4. The non-transitory computer-readable medium of claim 1, wherein the class library is generated using an object-oriented programming language.

5. The non-transitory computer-readable medium of claim 4, wherein the object-oriented programming language is selected from the group consisting of Java, C++, Smalltalk, Object Pascal, and Objective C.

6. The non-transitory computer-readable medium of claim 1, wherein the SNMP manager is configured to create a service object of the class, wherein the service object is representative of a service associated with SNMP to access the MIB objects, wherein the invokable method is a method of the service object; and
   wherein the SNMP agent is configured to access the MIB object according to the command message and the OID.

7. The non-transitory computer-readable medium of claim 1, wherein the invokable method returns a value to the SNMP manager indicative of a response from the SNMP agent.

8. A method, comprising:
   a simple network management protocol (SNMP) manager creating a service object of a class, wherein the service object is representative of a service associated with SNMP to access management information base (MIB) objects associated with a network device, wherein the SNMP manager links to a class library including the class; and
   the SNMP manager invoking a method of the service object, wherein the invoked method provides, to an SNMP agent, a command message and an object identifier (OID) of one of the MIB objects, wherein the MIB object is accessible to the SNMP agent based on the command message and the OID.

9. The method of claim 8, wherein the class library was generated from an XML document that includes a type variable representing a type of a mapping, and wherein the type of the mapping includes a group type mapping and a table type mapping.

10. The method of claim 9, wherein the XML document includes an XML object specifying the OID.

11. The method of claim 8, wherein the class library is generated using an object-oriented programming language.

12. The method of claim 11, wherein the object-oriented programming language is selected from the group consisting of Java, C++, Smalltalk, Object Pascal, and Objective C.

13. The method of claim 8, wherein the class library is generated by mapping the MIB objects to one or more extensible markup language (XML) objects in an XML document and by parsing the XML document with an XML-object parser.

14. A method, comprising:
   parsing an extensible markup language (XML) document, wherein the XML document maps a plurality of management information base (MIB) objects associated with a network device into one or more XML objects;
   generating a class library based on the parsing, wherein the one or more XML objects are mapped into a class included in the class library; and
   wherein the class includes a method invokable by a simple network management protocol (SNMP) manager to issue, to an SNMP agent, a command message and an object identifier (OID) of one of the plurality of MIB objects.

15. The method of claim 14, wherein the SNMP agent is configured to access the MIB object according to the command message and the OID.

16. The method of claim 14, wherein the invokable method translates a response from the SNMP agent to a form understandable by the SNMP manager.

* * * * *

UNITED STATES PATENT AND TRADEMARK OFFICE
CERTIFICATE OF CORRECTION

| | | |
|---|---|---|
| PATENT NO. | : 8,327,007 B2 | Page 1 of 2 |
| APPLICATION NO. | : 11/824396 | |
| DATED | : December 4, 2012 | |
| INVENTOR(S) | : Liu et al. | |

It is certified that error appears in the above-identified patent and that said Letters Patent is hereby corrected as shown below:

On the Title Page, item (56), under "OTHER PUBLICATIONS", in Column 2, Line 2, delete "1999." and insert -- 1999, --, therefor.

On the Title Page, item (56), under "OTHER PUBLICATIONS", in Column 2, Line 3, delete "No., pp. 396-400" and insert -- pp. 396-400, --, therefor.

On Title Page 2, item (56), under "OTHER PUBLICATIONS", in Column 1, Line 1, delete "Hong. 2003." and insert -- Hong, 2003, --, therefor.

On Title Page 2, item (56), under "OTHER PUBLICATIONS", in Column 1, Line 3, delete "management. Int. J. Newt. Manag." and insert -- management, Int. J. Newt. Manag., --, therefor.

On Title Page 2, item (56), under "OTHER PUBLICATIONS", in Column 1, Line 6, delete "Hong. 2002." and insert -- Hong, 2002, --, therefor.

On Title Page 2, item (56), under "OTHER PUBLICATIONS", in Column 1, Line 6, delete "Hong. 2002." and insert -- Hong, 2002, --, therefor.

On Title Page 2, item (56), under "OTHER PUBLICATIONS", in Column 1, Lines 6-7, delete "Gateway." and insert -- Gateway, --, therefor.

On Title Page 2, item (56), under "OTHER PUBLICATIONS", in Columns 1 & 2, Lines 13-14 & 1-2, delete "Cherkaoui O et al:"Towards a modular and interoperable SNMPv3" Network Operations and Management Symposium, 1998. NOMS 98., IEEE New Orleans, LA, USA Feb. 15-20, 1998,New York, NY,USA,IEEE, US, vol. 2, Feb. 15, 1998 (4 pages)." and insert -- Cherkaoui O. et al., "Towards a modular and interoperable SNMPv3", Network Operations and Management Symposium, 1998, NOMS 98, IEEE, New Orleans, LA, USA, Feb. 15-20, 1998, New York, NY, USA, IEEE, US, vol. 2, Feb. 15, 1998 (4 pages). --, therefor.

Signed and Sealed this
Twenty-second Day of July, 2014

Michelle K. Lee
*Deputy Director of the United States Patent and Trademark Office*

CERTIFICATE OF CORRECTION (continued)
U.S. Pat. No. 8,327,007 B2

On Title Page 2, item (56), under "OTHER PUBLICATIONS", in Column 2, Lines 3-7, delete "Yoda I et al:"Object oriented TMN based operations systems development platform" Communications, 1994. ICC '94, Supercomm/ICC '94, Conference Record,' Serving Humanity Through Communications.' IEEE International Conference E on New Orleans, LA, USA May 1-5, 1994, New York, NY, USA, IEEE, May 1, 1994 (6 Pages)." and insert -- Yoda I. et al., "Object oriented TMN based operations systems development platform" Communications, 1994, ICC '94, Supercomm/ICC '94, Conference Record, "Serving Humanity Through Communications.", IEEE International Conference on New Orleans, LA, USA, May 1-5, 1994, New York, NY, USA, IEEE, May 1, 1994 (6 Pages). --, therefor.

On Title Page 2, item (56), under "OTHER PUBLICATIONS", in Column 2, Lines 11-14, delete ""Towards a modular and interoperable SNMPv3",................vol. 2, Feb. 15, 2008, p. 391-394 (4 pages)."

In the Specification

In Column 4, Line 26, delete "brevity," and insert -- brevity --, therefor.

In Column 4, Line 45, delete ""<table-specific>"" and insert -- "<table-specific>", --, therefor.

In Column 8, Line 20, delete "sent" and insert -- represent --, therefor.

In Column 8, Line 35, delete "after services" and insert -- after the services --, therefor.